Patented Feb. 18, 1936

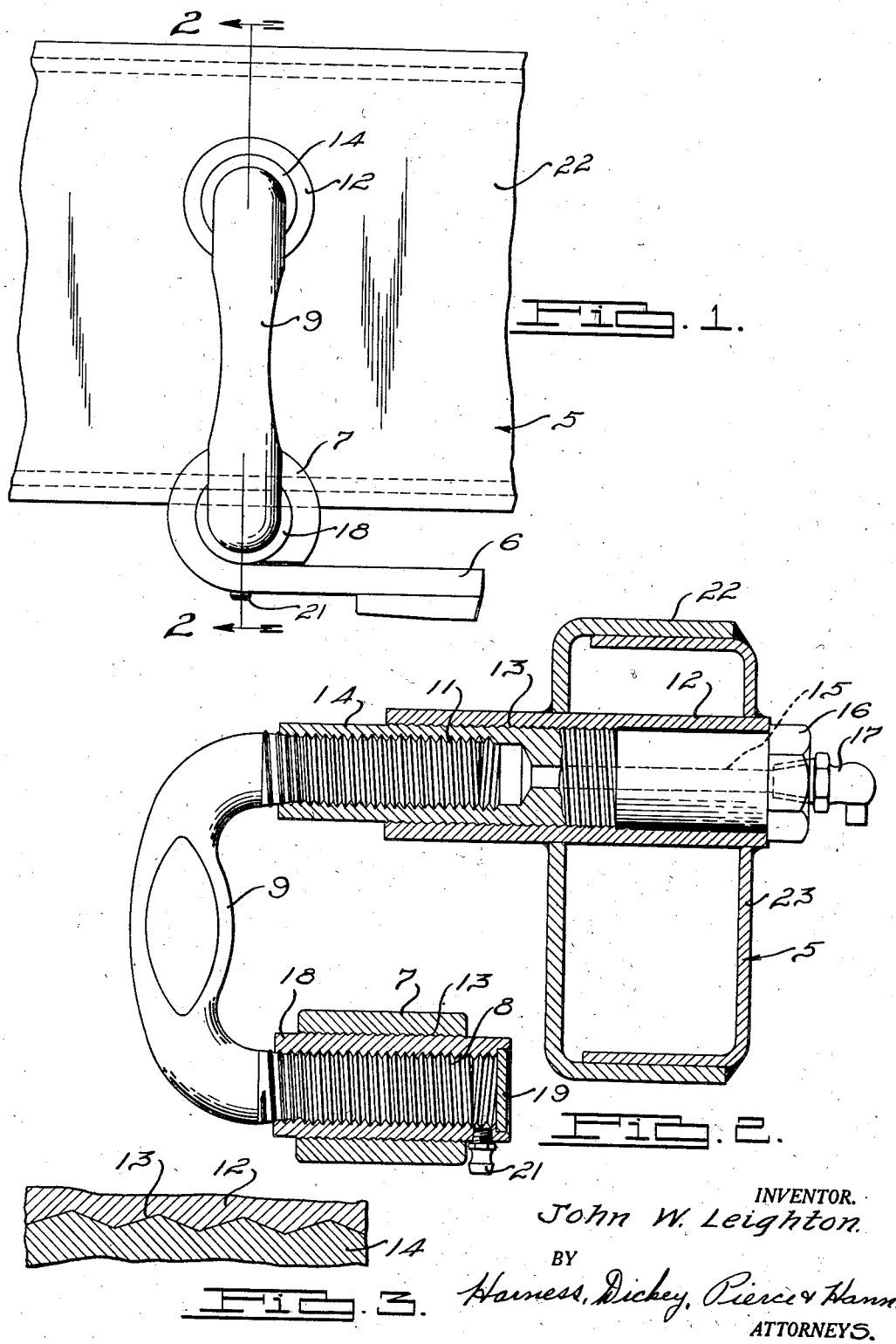

2,031,492

UNITED STATES PATENT OFFICE 2,031,492

SHACKLE SUPPORT

John W. Leighton, Port Huron, Mich.

Application June 9, 1934, Serial No. 729,879

10 Claims. (Cl. 267—54)

The invention relates to spring suspensions and particularly to the employment of a U-shaped bolt for connecting a frame to the end of a leaf spring.

One object of the invention is to provide an improved connection between one end of a U-shaped shackle and the frame of an automobile, which will facilitate assembly operations.

Another object of the invention is to provide an improved connection of the above designated character which positively locks the shackle to the frame while still permitting oscillatory movement of the shackle.

Other objects of the invention will become apparent from the following description, the drawing relating thereto and from the claims hereinafter set forth.

Figure 1 is a side view in elevation of a frame and spring interconnected by a U-bolt according to one form of the invention;

Fig. 2 is a sectional view of the structure illustrated in Fig. 1, taken on the line 2—2 thereof, and Fig. 3 is an enlarged sectional view of the thread engagement between the outer surface of the bushing and its supporting element.

Referring to Figs. 1 and 2, I have illustrated a chassis frame 5 supported on the end of a leaf spring 6, the other end of which is pinned to the frame on a fixed pivot in a well known manner. The end 7, shown in the figures, is supported on a lower stem 8 of a U-bolt 9, the upper stem 11 being connected to the chassis 5. The manner of effecting the connection of the stems 8 and 11 to the leaf spring end 7 and to the chassis frame 5 will now be described.

The chassis frame 5 has a fixed sleeve 12, a portion of the inner surface of which is provided with a thread 13, illustrated more clearly in Fig. 3. The thread has a crown diameter only slightly greater than the root diameter to provide a reduced slope to the thread side and this thread forms a locking engagement with similar thread on a bushing 14 due primarily to the friction between the sloping thread surfaces. The bushing 14 is provided with a standard thread on the inside to mate with the thread on the stem 11, the pitch of this thread being the same as that of the thread 13.

The thread of the bushing 14 and that on the stem 11 have a taper at the end, as illustrated in Fig. 2, similar to the taper on a pipe thread, to provide increased strength at the base of the stem. The bushing 14 has an aperture 15 extending therethrough and the outer end is provided with a hexagon head 16 containing a grease valve 17 through which grease is forced and retained in the vicinity of the thread of the steam 11 and the bushing.

The lower stem 8 of the U-bolt 9 engages a bushing 18 which is threaded in a similar manner as the bushing 14 above noted having an inner thread which tapers at the end to effect a pipe thread engagement. The opposite end of the bushing is sealed by a welch washer 19 and a grease retaining valve 21 communicates with the threaded interior of the bushing. The outer portion of the bushing and the inner portion of the leaf end 7 are provided with the thread 13 above described having the same thread pitch as that on the stem 8 but of materially reduced depth. The thread 13 forms a locking engagement, the same as the thread 13 between the bushing 14 and the sleeve 12, and any oscillation of the U-bolt 9 occurs due to the turning movement of the stems 8 and 11 in the bushings 18 and 14, respectively.

The assembly of the bushings and the U-bolt is readily effected because of the similar pitch of the thread 13 and the thread of the stems 8 and 11. The bushings are screwed into the sleeve 12 and the spring 7 and on the stems 11 and 8, respective, and the advancement of the thread on the inner and outer portion of each bushing may occur at the same time because of the similar pitch of the inner and outer threads to effect the positioning of the elements, as illustrated in Fig. 2.

In the figure, I have illustrated the chassis frame as being made up of telescoped inner and outer channel elements 22 and 23, respectively, which are welded together. The sleeve 12 is in the nature of a tube which projects through the web of the channel element and is welded and retained in fixed relation thereto. The U-bolt 9 is employed to secure the spring 7 to the chassis frame 5 and is permitted to oscillate, by the movement of the spring, through the rotation of the stems 8 and 11. The bushings 14 and 18 are prevented from turning because of the locking thread 13 which secures the bushing to the spring and collar.

While but a single embodiment of the invention has been illustrated, it will be apparent to those skilled in the art that various changes, omissions, additions and substitutions may be made therein without departing from the spirit and scope of the invention, as set forth in the accompanying claims.

I claim:

1. In combination, a frame member, a sleeve projecting through the frame member and rigidly connected thereto, a bushing threaded into the sleeve and projecting from one side of the frame member, and a shackle bolt threaded into the projecting end of the bushing.

2. In combination, a frame member, a sleeve projecting through the frame member and rigidly connected thereto, a bushing threaded into the sleeve and projecting from one side of the frame member, a shackle bolt threaded into the projecting end of the bushing, and means on the opposite end of the bushing and at the opposite side of the frame for manually turning the bushing.

3. In combination, a frame member, a sleeve projecting through the frame member and rigidly connected thereto, a bushing threaded into the sleeve and projecting from one side of the frame member, and a shackle bolt threaded into the projecting end of the bushing, said bushing and sleeve having self locking, interengaging threads.

4. In combination, a frame member, a sleeve projecting through the frame member and rigidly connected thereto and projecting from one side thereof, a bushing threaded into the sleeve and projecting from the projecting end of the latter, means on the opposite end of the bushing and outwardly of the adjacent end of the sleeve for manually turning the bushing, and a shackle bolt threaded into the end of the bushing within the projecting end of the sleeve.

5. In combination, a frame member, a sleeve projecting through the frame member and rigidly connected thereto and projecting from one side thereof, a bushing threaded into the sleeve and projecting from the projecting end of the latter, means on the opposite end of the bushing and outwardly of the adjacent end of the sleeve for manually turning the bushing, and a shackle bolt threaded into the end of the bushing within the projecting end of the sleeve, the threads on the interior of the sleeve and exterior of the bushing being of self-locking character and the threads on the interior of the bushing and on the bolt being of such character as to allow oscillatory movement of the bolt in the bushing.

6. In combination, a chassis frame member, an internally threaded sleeve fastened to the frame member and projecting from one side thereof, an internally and externally threaded bushing threaded into the sleeve and projecting beyond the outer ends thereof, and a shackle bolt threaded into such projecting end of the bushing.

7. In combination, a chassis frame member comprising laterally spaced wall portions having aligned openings, an internally threaded sleeve projecting through such openings and being welded to the walls respectively and having a portion projecting laterally beyond the outer side of one of the walls, a bushing threaded through the sleeve and having one end projecting beyond the end of the projecting portion of the sleeve and having a head at its other end engaging the other end of the sleeve, said bushing along its end projecting from the frame and from the sleeve projecting portion being internally threaded, and a shackle bolt threaded into such end of the bushing.

8. In combination, a chassis frame member comprising laterally spaced wall portions having aligned openings, an internally threaded sleeve projecting through such openings and being welded to the walls respectively and having a portion projecting laterally beyond the outer side of one of the walls, a bushing threaded through the sleeve and having one end projecting beyond the end of the projecting portion of the sleeve and having a head at its other end engaging the other end of the sleeve, said bushing along its end projecting from the frame and from the sleeve projecting portion being internally threaded, and a shackle bolt threaded into such end of the bushing, the internal threads on the sleeve and external threads on the bushing being of self-locking character, and the internal threads on the bushing and the threads on the bolt being such that the bolt may readily turn in the bushing.

9. In combination, a chassis frame member having a lateral opening therein, an internally threaded sleeve projecting through said opening, secured against movement relative to said frame member and having one end projecting laterally beyond said opening, a bushing threaded into said sleeve with a portion in said laterally projecting end of said sleeve and having a head positioned adjacent the opposite end of said sleeve, said bushing being internally threaded in the portion adjacent said projecting end of the sleeve, and a shackle bolt threaded into said end of the bushing.

10. A shackle bolt assembly comprising an elongated internally threaded sleeve having a smooth cylindrical exterior, a bushing in said sleeve having exterior threads operatively engaged with said sleeve threads and interior threads at one end thereof, and a U-shaped shackle bolt having one end thereof threaded into said threaded bushing end and terminating short of the opposite end of said sleeve.

JOHN W. LEIGHTON.